June 30, 1936.  H. W. GOODALL  2,046,114

EXPANSION RING HOSE COUPLING

Filed Oct. 21, 1935

INVENTOR

Howard W. Goodall
BY
Augustus B. Stoughton
ATTORNEY.

WITNESS:
Rob't R. Kitchel.

Patented June 30, 1936

2,046,114

UNITED STATES PATENT OFFICE 2,046,114

EXPANSION RING HOSE COUPLING

Howard W. Goodall, Aldan, Pa.

Application October 21, 1935, Serial No. 45,902

1 Claim. (Cl. 285—77)

An expansion ring hose coupling comprises a coupling element into which the end of a hose is inserted and within the hose there is inserted a metallic ring which is exposed at the surface of the rubber lining of the hose and which is expanded. Inasmuch as the metal of the ring is exposed at the surface of the rubber lining of the hose such an arrangement is not adapted for use in connection with fluids or the like containing acid or gritty matter, such, for example as sand, because the acid or gritty matter passing through the hose contacts with the metal of the expansion ring and in a short time corrodes or erodes it and renders it useless in the performance of its intended function, which is to hold the hose tightly up against the inner face of the coupling element which is frequently roughened or sawtoothed or grooved.

The object of the present invention is to obviate the above mentioned defects and disadvantages and to adapt an expansion type hose coupling for use in conveying acid or gritty material, or more accurately fluid containing acid or gritty material, under even comparatively high pressure.

Other objects of the invention will appear from the following description at the end of which the invention will be claimed.

Generally illustrated, the invention comprises an expansion type coupling member and its complemental hose length having a rubber lining substantially continuous throughout the hose length and provided with an expansion ring or rings arranged in the hose and outside of the rubber lining, which protects the ring in respect to erosion by gritty matter or acid passing through the hose.

The invention also comprises the improvements to be presently described and finally claimed.

In the following description reference will be made to the accompanying drawing forming part hereof and in which, Figure 1 is a longitudinal sectional view somewhat diagrammatic of an expansion type hose coupling embodying features of the invention.

Figure 1:
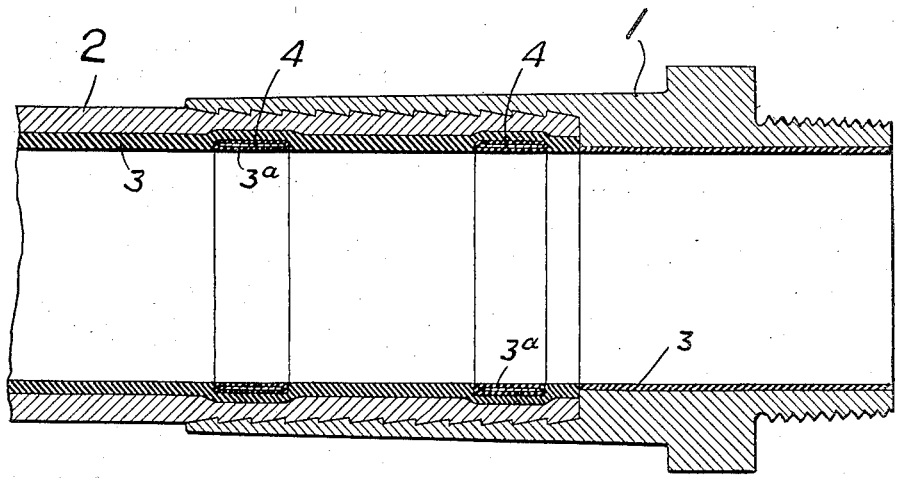

Referring to the drawing, 1 indicates an expansion ring type coupling member and its inner surface is provided with a saw-toothed or grooved construction. 2 is a hose length built up of plies of duck and rubber in any usual and well understood manner. There is a rubber lining which extends continuously throughout the length of the hose and the rubber lining is indicated at 3 and 3ª. A rubber lining resists the corroding action of acids and the eroding action of grit sand and the like carried by a fluid passing through the hose. The metallic expansion ring or rings is or are disposed in the hose and arranged outside of the rubber lining 3 and 3ª in Figure 1, and 3 in Figure 2, and the rubber lining overlies the metal surface of the ring and protects the ring from corrosion and erosion. Thus there is provided a structure adapted for use in conveying acid, muddy, sandy or like fluid, so that an expansion type hose coupling is promoted to a large field of use from which it was heretofore excluded.

Figure 2:
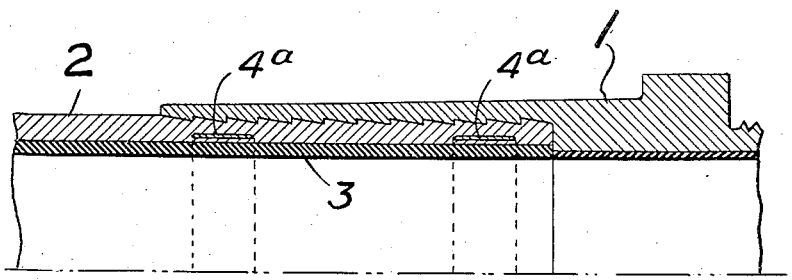
Figure 2 is a similar view illustrating a modification.
Figure 3:
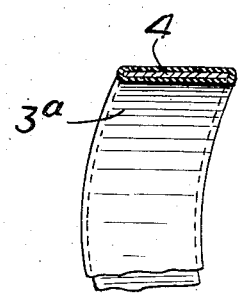
Figure 3 is a perspective view drawn to an enlarged scale and illustrating one of the parts shown in Figure 1.

The continuous or substantially continuous rubber lining of the hose is provided in the construction shown in Figure 1 by covering the surface of the metal expansion ring 4 with rubber, the inner surface of which, after the ring is expanded, lies substantially flush and continuous with the rubber lining of the hose. It may be remarked that the rubber covering, adherent to the expansion ring, expands when the ring is expanded and in that way preserves its continuity. As shown in Figure 2, the metallic ring or rings 4ª are embedded in the body of the hose outside of the hose lining 3 which protects them from erosive and corrosive action and in this construction the metallic rings may or may not be covered with rubber.

In some cases, for example as shown in Figure 1, the end of the hose may be inserted in the coupling member and held in place therein by the expansion of the rings and the resilience of the hose. In other cases, for example as shown in Figure 2, the hose may be vulcanized after its insertion and expansion in the coupling element.

In this description and in the claim the word rubber is used to include rubber like materials and substitutes.

It will be obvious to those skilled in the art, to which the invention relates, that modifications may be made in details of construction and arrangement and in matters of mere form without departing from the spirit of the invention which is not limited to such matters or otherwise than as the prior art and the appended claim may require.

I claim:

In an expansion type hose coupling a rubber covered expansion ring and a rubber lining for the hose contacting with the outer surface of the rubber covering of the ring, the rubber surface of the hose lining and inner surface the rubber covering of the ring being substantially flush and providing a continuous lining throughout the structure.

HOWARD W. GOODALL.